United States Patent
Jellinghausen

(10) Patent No.: US 7,743,688 B2
(45) Date of Patent: Jun. 29, 2010

(54) HANDHELD PORTABLE TUBING CUTTER DRIVABLE BY HANDHELD POWER DRILL AND HAVING A MINIMIZED WORKING PROFILE

(76) Inventor: Eric J. Jellinghausen, 125 Maple St., Vacaville, CA (US) 95688

( * ) Notice: Subject to any disclaimer, the term of this patent is extended or adjusted under 35 U.S.C. 154(b) by 465 days.

(21) Appl. No.: 11/786,556

(22) Filed: Apr. 12, 2007

(65) Prior Publication Data
US 2007/0240312 A1 Oct. 18, 2007

Related U.S. Application Data

(60) Provisional application No. 60/793,316, filed on Apr. 18, 2006.

(51) Int. Cl.
*B23B 5/16* (2006.01)
*B23B 3/00* (2006.01)
(52) U.S. Cl. .............................. 82/113; 82/46
(58) Field of Classification Search ............... 407/48, 407/40, 53, 103, 33, 34, 64; 82/113, 46, 82/128, 131, 70.2
See application file for complete search history.

(56) References Cited

U.S. PATENT DOCUMENTS

| 4,691,600 | A | * | 9/1987 | Carlson et al. ............... 82/113 |
| 4,958,542 | A | * | 9/1990 | Skerrett ........................ 82/113 |
| 5,314,270 | A | * | 5/1994 | Lavancy et al. ............. 408/1 R |
| 5,351,587 | A | * | 10/1994 | Griffin ........................ 82/113 |
| 5,903,980 | A | * | 5/1999 | Collier et al. ................. 30/101 |
| 6,412,376 | B1 | * | 7/2002 | Borgia, Jr. .................... 82/113 |
| 6,581,498 | B2 | * | 6/2003 | Beyer ......................... 82/1.11 |
| 6,761,512 | B2 | * | 7/2004 | Vatter ......................... 408/97 |
| 6,968,761 | B2 | * | 11/2005 | Frank .......................... 82/113 |
| 6,993,848 | B2 | * | 2/2006 | Snyder et al. ................ 33/21.3 |
| 7,478,548 | B2 | * | 1/2009 | Fogg ............................ 72/71 |
| 7,549,359 | B2 | * | 6/2009 | Hennessey et al. ........... 82/113 |

* cited by examiner

*Primary Examiner*—Will Fridie, Jr.
(74) *Attorney, Agent, or Firm*—Bruce H Johnsonbaugh

(57) ABSTRACT

A handheld, portable tubing cutter driveable by a handheld power drill is provided. The tubing cutter includes a support cylinder having distal and, proximal ends. The proximal end of the support cylinder is adapted to engage the drill chuck of an ordinary handheld power drill. A cylindrical cutting head, known in the art, is removably connected to the distal end of the support cylinder. The longitudinal axis of the support cylinder is aligned with, and parallel to, the longitudinal axis of the tubing to be cut. Once the cutting head is placed on the tubing to be cut and the support cylinder is connected to the cutting head, the device is actuated and operates with a minimized working profile.

7 Claims, 6 Drawing Sheets

HANDHELD PORTABLE TUBING CUTTER DRIVABLE BY HANDHELD POWER DRILL AND HAVING A MINIMIZED WORKING PROFILE

CROSS-REFERENCE TO RELATED APPLICATION

This application claims the benefit of and priority from U.S. provisional application Ser. No. 60/793,316 filed on Apr. 18, 2006.

BACKGROUND AND BRIEF SUMMARY

The present invention pertains generally to the field of plumbing hand tools. More particularly, the present invention provides a portable motorized tubing cutter for quickly and efficiently cutting off the ends of copper stub-outs, for example. The cutting tool of the present invention has a minimized working profile allowing the tool to be used in confined or tight spaces. The tool can also be used to cut tubing other than copper tubing.

Various cutting tools are known in the prior art for cutting copper and other tubing. Motorized cutting tools are known which are driveable by handheld drills, as shown in U.S. Pat. No. 5,351,587. However, that cutting tool requires the user to tighten a knurled knob or head 18. Knob 18 extends radially away from the longitudinal axis of the tubing being cut. Such a tool is difficult to operate in tight and/or confined spaces such as beneath a bathroom sink or beneath a kitchen sink.

The prior art also includes various power driven handheld tubing cutters which extend radially outwardly from the longitudinal axis of the pipe a considerable distance to provide for either a power supply and/or a handhold for the user. Such devices include U.S. Pat. Nos. 5,903,980; 6,202,307; 5,315,759 and 4,953,292.

There is clearly a need for tubing cutters with a minimized "working profile" to allow the cutter to operate in confined or tight spaces. This need increases as building square footage increases in cost and as plumbing lines must be placed closer to walls, fixtures and other plumbing lines.

The present invention satisfies the aforementioned need and provides a handheld motorized tubing cutter having a minimized "working profile." The phrase "working profile," as used herein, refers to the radially extending distance from the longitudinal axis of the tubing to be cut that is required to provide adequate clearance for the tool and/or the hands of the user operating the tool. The tool of the present invention provides a "working profile" that is less than half of the "working profile" required by other known motorized tubing cutters.

As described below, the present invention is a small, rugged, portable tubing cutter which is driveable by an ordinary handheld power drill. The cutter includes in a first embodiment a cutting head and a separate support cylinder. The support cylinder is directly connected to an ordinary handheld power drill. The cutting head, in the first embodiment, is a separate handheld tool built according to the embodiment shown in FIGS. 13-15 of U.S. Pat. No. 5,903,980, which patent is incorporated in its entirety herein by reference as though set forth in full. The small handheld cutting head is opened and placed on the stub-out and then closed. The cylindrical housing of the present invention is then slid over the cutter head. A beveled surface inside the cylindrical housing grips the cutting head. The handheld drill is then actuated and the end of the copper stub-out is cut quickly and cleanly.

A primary object of the invention is to provide a reliable, sturdy and motorized tubing cutter having a minimized "working profile" for use in tight or confined spaces for cutting copper stub-outs and other tubing.

Another object of the invention is to provide a tubing cutter wherein the cutter is automatically aligned to produce a clean cut perpendicular to the axis of the pipe being cut and wherein the resulting cut is free of burrs.

Further objects and advantages will become apparent from the following description and drawings wherein:

DETAILED DESCRIPTION OF THE DRAWINGS

Figure 1:
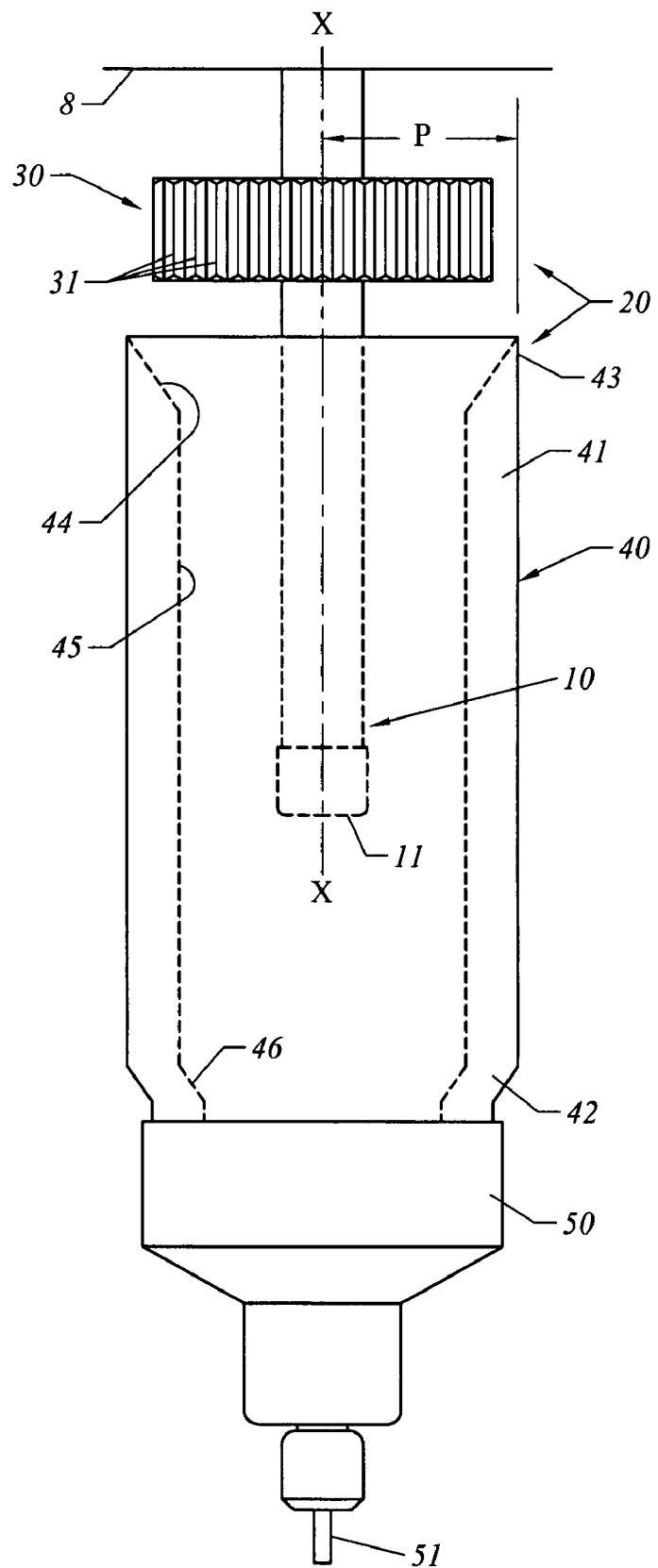
FIG. 1 is a side elevational view of a first embodiment of the invention.
Figure 2:
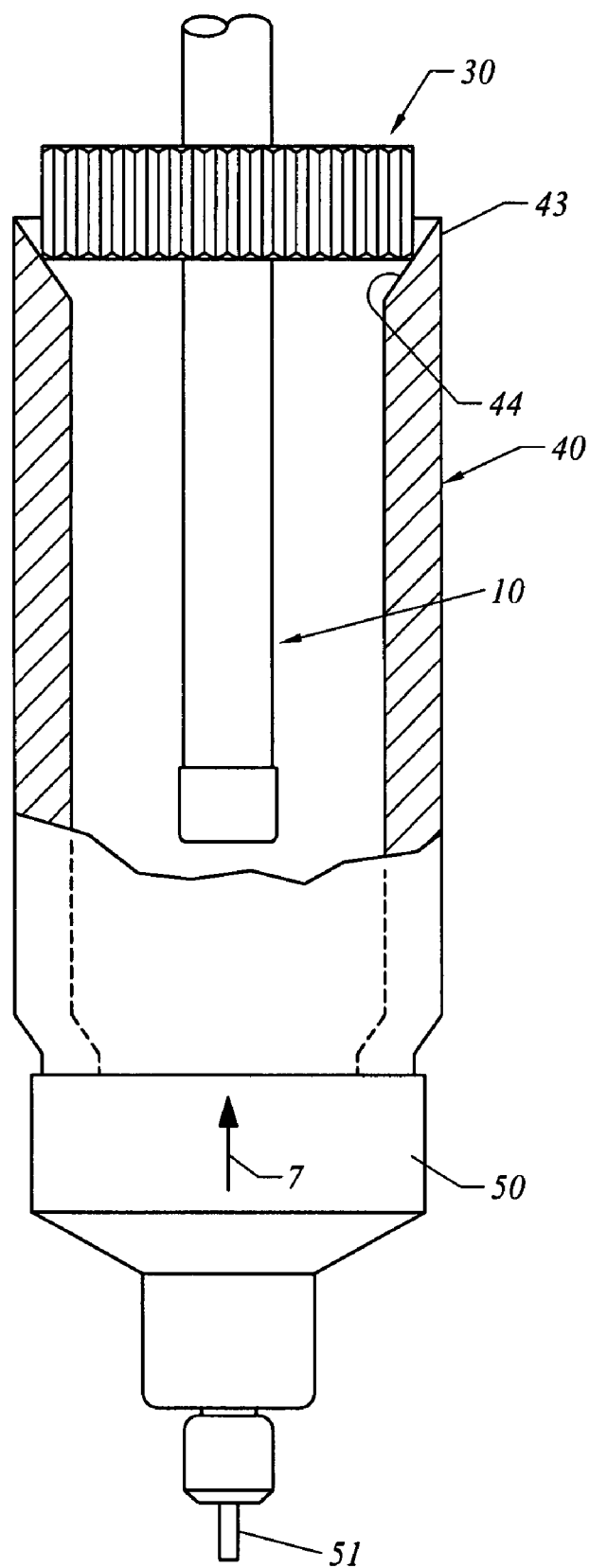
FIG. 2 is a side elevational view of the tubing cutter shown in FIG. 1, wherein the tubing cutter is shown partially in section as it is being placed in position to be actuated.

FIGS. 1 and 2 illustrate a first embodiment of a tubing cutter 20 of the invention. A typical copper tubing stub-out 10 is shown extending outwardly from a plumbing wall 8. The copper tubing 10 has a longitudinal axis X-X. As shown in FIG. 1, the cutter head 30, shown as described in U.S. Pat. No. 5,903,980, is shown after it has been placed over the copper stub-out 10. Cutter head 30 has a series of serrated ridges 31 formed on its periphery to allow a user to easily grasp and turn the cutter head 30 by hand.

A support sleeve 40 according to the invention is an elongated cylindrical piece of PVC pipe 41. The proximal end 42 of cylinder 41 is tapered and is permanently attached to a tapered metallic base 50 having a drive shaft 51 engageable by an ordinary handheld drill chuck (not shown for clarity). The distal end 43 of cylinder 41 is beveled as shown in phantom at 44. The remainder of the interior wall of cylinder 41 is cylindrical as shown in phantom at 45 and is tapered or beveled as shown at 46 near its proximal end 42. The purpose of bevel 44 is to allow the distal end 43 of cylinder 41 to slide onto and make frictional contact with the surface of cutter head 30. As shown in FIG. 2, the support cylinder 40 has been moved in the direction of arrow 7 towards the plumbing wall 8 and contact has been made between the inclined or beveled edge 44 of the distal end 43 of cylinder 41 with the outer surface of cutter head 30. The user then simply actuates the handheld drill to cause support cylinder 40 to rotate which in turn causes cutter head 30 to rotate and the copper tubing is quickly cut with a smooth, perpendicular and burr-free cut. When tubing cutter 20 is in position to be actuated, the longitudinal axis of support cylinder 240 is aligned with and parallel to axis X-X.

It is significant to note in FIG. 1 that the "working profile" P is the distance extending from the longitudinal axis X-X of stub-out 10 to the outer surface of sleeve 40. For example, the embodiments shown in FIGS. 1-5 are used for cutting ½ inch (12.7 mm) diameter tubing. The support sleeve or cylinder shown in FIGS. 1-5 has an outer diameter of approximately 2.30 inches (58.4 mm). The working profile is therefore 1.15 inch or 29.2 mm. The working profile is therefore only 2.3 times the diameter of the tubing being cut! This "working profile" is relatively small and is less than half the "working profile" of any known power driven tubing cutter known to the applicant. The "working profile" refers to the distance P when the cutter 20 is actuated. Of course, as shown in the embodiment of FIGS. 1 and 2, the cutter head 30 must be opened sufficiently to be placed in position on stub-out 10 as shown in FIG. 1. However, it is possible to apply the handheld cutter head 30 as close as possible to the tip 11 of stub-out 10 and then slide cutter head 30 to the position shown in FIG. 1 where the cut is to be made. The prior art devices noted above either have knobs or handholds which require a "working profile" considerably larger than that provided by the present invention.

Figure 3:
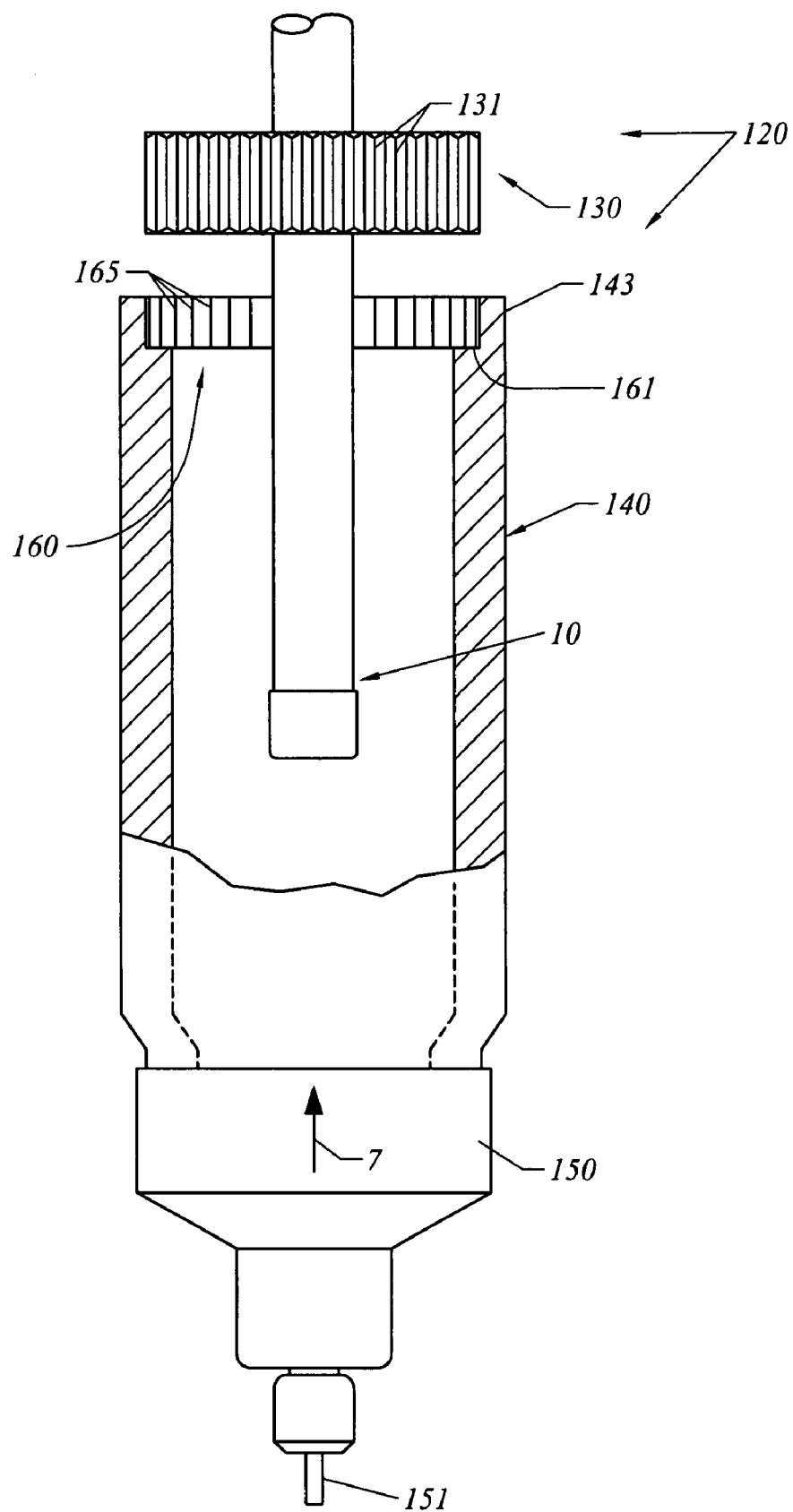
FIG. 3 is a side elevational view, partially in section, of a second embodiment of the invention.

FIG. 3 illustrates a second embodiment of the invention wherein the cutter 120 includes the cutter head 130 identical to the cutter head 30 shown in FIGS. 1 and 2. The support cylinder 140 has a distal end 143 that has a serrated seat 160 formed therein. Seat 160 includes a support ledge 161 and a series of serrations 165 that are intended to slidably engage the serrations 131 on cutting head 130. The cutting head 130 therefore slidably engages the distal end 143 of support cylinder 140 and is supported by the base or support ledge 161 of the serrated seat 160.

Figure 4:
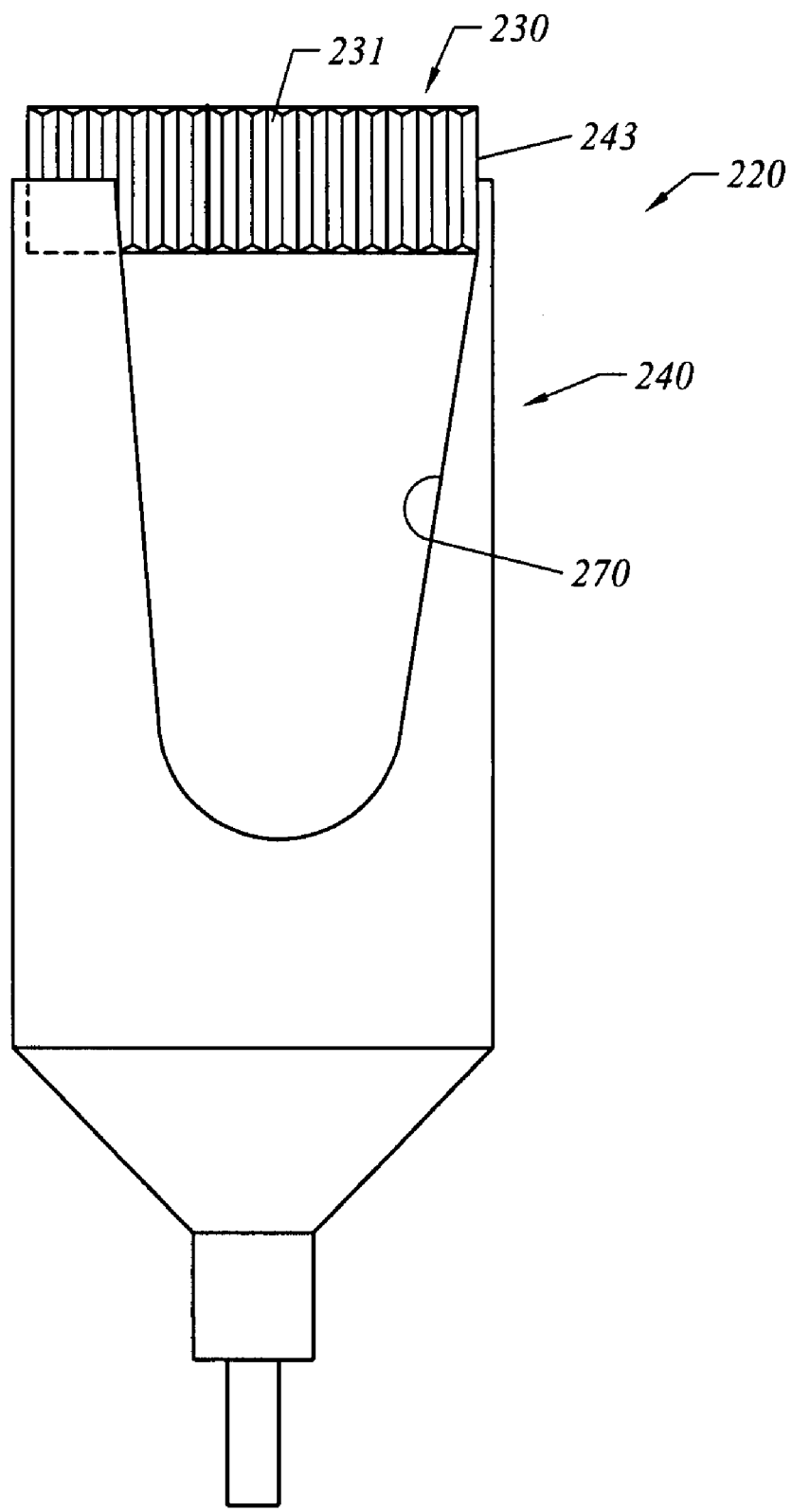
FIG. 4 is a side elevational view of a third embodiment of the invention wherein the cutting head 230 is in its closed position.

FIG. 4 illustrates a third embodiment of the invention wherein the cutter 220 includes a support cylinder 240 having a distal end 243. A cutting head 230 is integrally formed into the distal end 243 of support cylinder 240. The cutting head, in its position shown in FIG. 4, is in its closed position wherein a movable and pivotable plate 231 is shown in its closed position. Movable plate 231 preferably has an over-the-center spring charging feature, as shown and described in U.S. Pat. No. 5,903,980, referred to above. This feature allows the movable plate 231 to remain in its closed position shown in FIG. 4.

Figure 5:
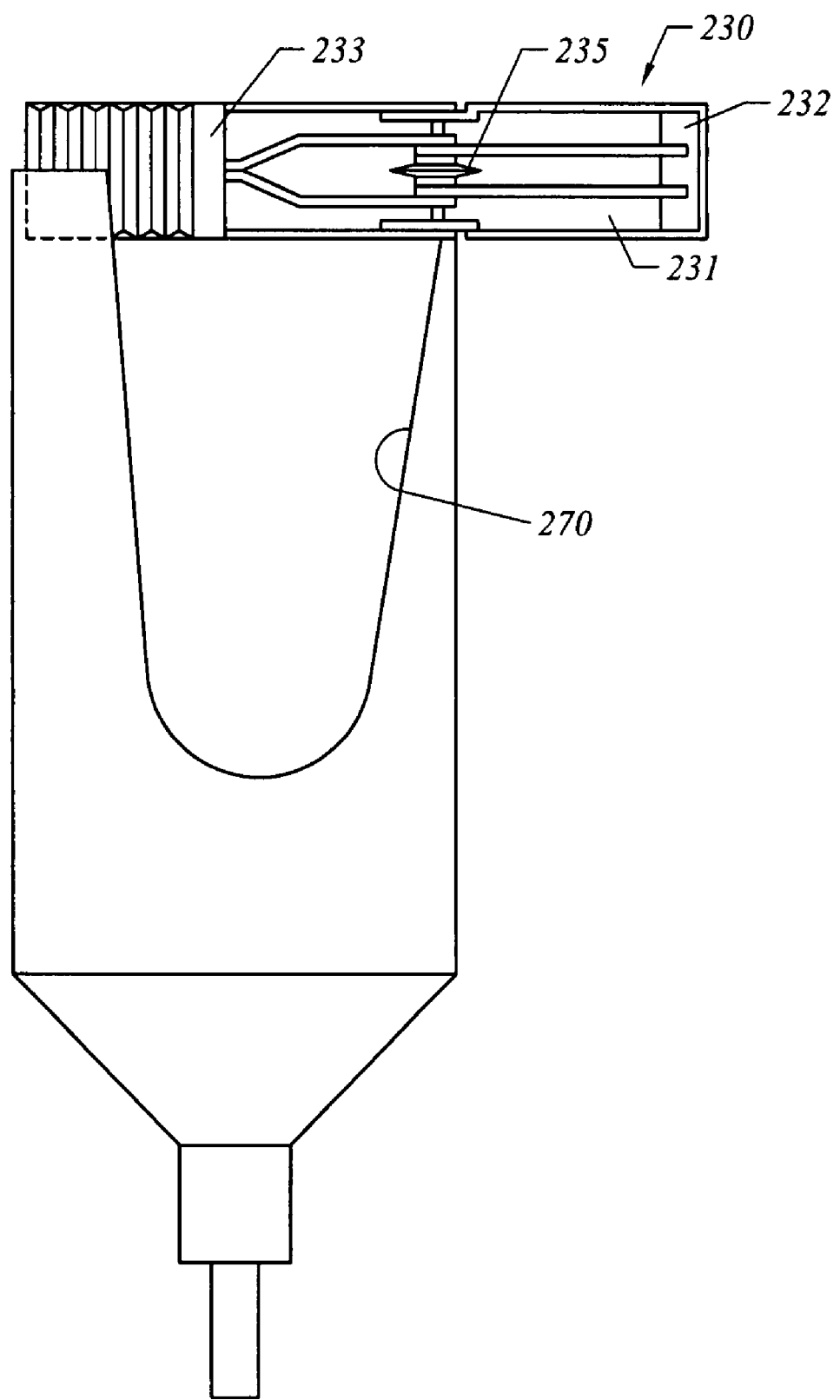
FIG. 5 is a side elevational view of the third embodiment of FIG. 4 wherein the cutting head 230 is shown in its open position.

FIG. 5 illustrates the cutter head 230 shown in its open position wherein the movable plate or door 231 is opened to allow the cutter head to be placed over the end of the tubing to be cut. The movable hatch or plate 231 has an inclined surface 232 which mates with a similarly inclined surface 233 on the body of cutter head 230, against which surface 232 rests in the closed position. A cutting wheel 235 is visible in FIG. 5.

An elongated slot 270 is shown in FIGS. 4 and 5 which facilitates separation of the tool from the stub-out. An elongated slot such as 270 may also be provided in the embodiments shown in FIGS. 1-3 to assist in extracting or separating the cutter head from the support cylinder.

Figure 6:
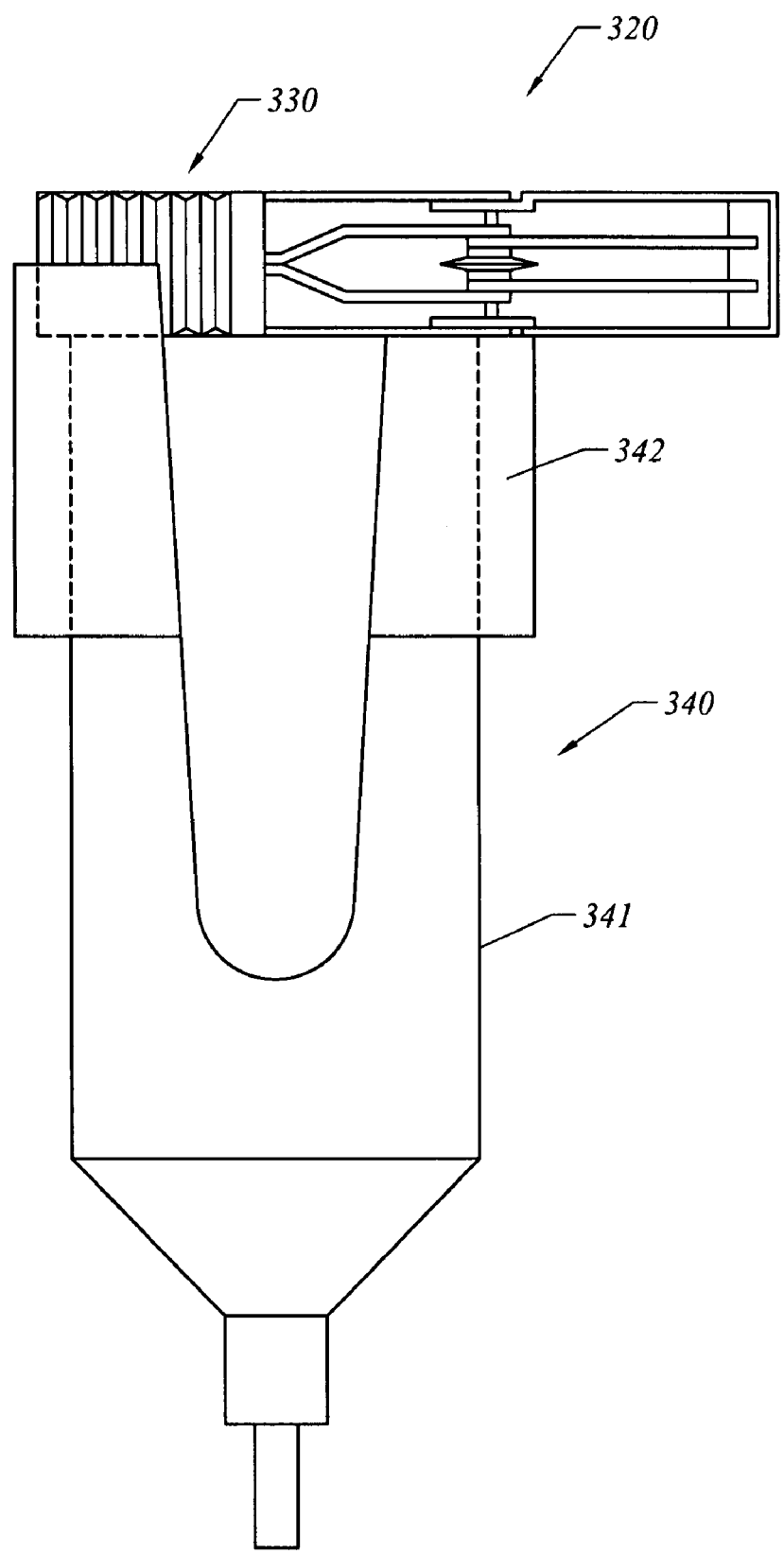
FIG. 6 is a side elevational view of a fourth embodiment of the invention wherein the cutting head 330 is shown in its open position.

FIG. 6 illustrates a fourth embodiment of the invention wherein the cutter 320 includes a two-part support cylinder 340 which includes inner cylinder 341 and outer cylinder 342 which is adhesively attached to inner cylinder 341. The purpose of outer cylinder 342 is to support a larger size cutting head 330 capable of cutting ¾ inch tubing. The embodiments shown in FIGS. 1-5 are designed to cut ½ inch tubing. The working profile for the larger cutter 320 of FIG. 6 is approximately 1.40 inch (or 35.06 mm), since the outer diameter of outer cylinder 342 is about 2.80 inches (or 71.12 mm). Therefore, the working profile for the cutter 320 of FIG. 6 is only 1.8 times as large as the outer diameter of the tubing being cut!

The material used in the support cylinder for all embodiments is preferably carbon-polyvinyl chloride (CPVC) plastic. Ordinary polyvinyl chloride (PVC) plastic may also be used, as well as other materials such as metal.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A handheld, portable tubing cutter for cutting off a copper tubing stub out, wherein said copper tubing stub out has a longitudinal axis, and wherein said cutter has a minimized working profile, said tubing cutter driveable by a handheld power drill having a drill chuck, comprising:
   a support cylinder having a distal end and a proximal end,
   drive means formed at said proximal end of said support cylinder to engage said drill chuck so that actuation of said power drill rotates said support cylinder,
   a cylindrical cutting head adapted to cut said copper tubing stub out by contacting the outer surface of said tubing and being rotated around said longitudinal axis of said tubing to cut said tubing perpendicularly to said longitudinal axis of said tubing, and
   connecting means for removably attaching said cutting head to said distal end of said support cylinder,
   wherein said tubing cutter extends radially outwardly from said tubing, but has no parts that extend radially outward beyond the outer diameter of said support cylinder when said tubing cutter is in operation, whereby said working profile of said tubing cutter is the same as the outer diameter of said support cylinder.

2. The apparatus of claim 1 wherein the tubing to be cut has a longitudinal axis X-X and wherein said support cylinder has a longitudinal axis that is positioned parallel to said axis X-X when said tubing cutter is to be actuated.

3. The apparatus of claim 1 wherein said support cylinder has an elongated slot formed in a side wall.

4. The apparatus of claim 3 wherein said distal end of said support cylinder resiliently carries said cutting head.

5. The apparatus of claim 4 wherein said cutting head includes a movable plate and wherein said movable plate is aligned within said elongated slot.

6. The apparatus of claim 1 wherein said connecting means comprises a beveled surface at said distal end of said support cylinder.

7. The apparatus of claim 1 wherein said cutting head has a serrated outer surface and wherein said connecting means comprises a serrated surface in said distal end of said support cylinder that slidably receives said serrated surface of said cutting head.

* * * * *